United States Patent [19]

Silva et al.

[11] 4,414,280

[45] Nov. 8, 1983

[54] MEMBRANES AND COMPOSITES FROM FLUOROPOLYMER SOLUTIONS

[75] Inventors: Raimund H. Silva; Paul R. Resnick, both of Wilmington, Del.; Roger A. Smith, Kennett Square, Pa.

[73] Assignee: E. I. Du Pont de Nemours and Company, Wilmington, Del.

[21] Appl. No.: 327,062

[22] Filed: Dec. 3, 1981

Related U.S. Application Data

[60] Division of Ser. No. 176,595, Aug. 8, 1980, Pat. No. 4,348,310, which is a continuation-in-part of Ser. No. 79,173, Sep. 26, 1979, abandoned.

[51] Int. Cl.$^3$ .............................................. B32B 27/24
[52] U.S. Cl. .................... 428/422; 204/296; 210/500.2; 210/506; 260/543 F; 260/544 F; 427/245; 521/27; 524/167; 524/316; 524/544; 560/184
[58] Field of Search ...................... 204/296; 210/500.2, 210/506; 260/543 F, 544 F; 427/245; 428/422; 521/27; 524/167, 316, 544; 560/184

[56] References Cited

U.S. PATENT DOCUMENTS

| | | | |
|---|---|---|---|
| 3,170,954 | 2/1965 | Rosenberg | 260/543 |
| 3,250,808 | 5/1966 | Moore, Jr. et al. | 260/535 |
| 3,282,875 | 11/1966 | Connolly et al. | 260/29.6 |
| 3,692,569 | 9/1972 | Grot | 117/138.8 |
| 3,859,330 | 1/1975 | Proskow | 260/47 UA |
| 4,038,213 | 7/1977 | McClure et al. | 252/430 |
| 4,065,366 | 12/1977 | Oda et al. | 204/98 |
| 4,188,354 | 2/1980 | Munari et al. | 264/22 |
| 4,259,226 | 3/1981 | Suhara et al. | 260/33.4 |

FOREIGN PATENT DOCUMENTS

| | | |
|---|---|---|
| 2510071 | 9/1975 | Fed. Rep. of Germany . |
| 54-42152 | 4/1978 | Japan . |
| 54-42151 | 10/1979 | Japan . |
| 1286859 | 8/1972 | United Kingdom . |

Primary Examiner—Robert A. Dawson

[57] ABSTRACT

Solutions and membranes formed therefrom are disclosed with solvents having completely halogenated, saturated, hydrocarbon backbones and solubility parameters within a particular range. Preferred solvent have at least one ether linkage. An exemplary solvent is

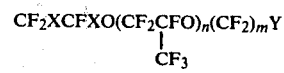

wherein X is F, Cl, Br, and I; n is 0, 1, and 2; m is 1, 2, and 3; and Y is COOCH$_3$ and SO$_2$F. The solutions include perfluorinated copolymers having high equivalent weight which have been prepared from tetrafluoroethylene and perfluorinated sulfonyl fluoride- or carboxyl-containing vinyl monomers.

4 Claims, No Drawings

MEMBRANES AND COMPOSITES FROM FLUOROPOLYMER SOLUTIONS

This is a division of application Ser. No. 176,595, filed Aug. 8, 1980 and now U.S. Pat. No. 4,348,310 which, in turn, is a continuation-in-part of application Ser. No. 79,173, filed Sept. 26, 1979, now abandoned.

BACKGROUND OF THE INVENTION

1. Field of the Invention

This invention relates to solutions of perfluorinated copolymers. The solutions of this invention are particularly related to perfluorinated copolymers of tetrafluoroethylene and perfluorinated sulfonyl fluoride- or carboxyl-containing vinyl monomer of equivalent weight greater than about 1000. Those copolymers have many uses including uses as membrane material in liquid permeation processes such as electrolysis, dialysis, and reverse osmosis. Solutions of the present invention can be used to make such membranes or to repair membranes already made. Such solutions can also be used to coat support materials to provide an efficient catalyst.

2. Discussion of the Prior Art

Ionic fluorocarbon copolymers such as the copolymers of ethylene and sulfonyl fluoride- or carboxyl-containing vinyl monomer mentioned above have been known for many years. For example, U.S. Pat. No. 3,282,875 issued Nov. 1, 1966 discloses such copolymers. U.S. Pat. No. 3,692,569, issued Sept. 19, 1972 discloses such copolymers and discloses that the copolymer materials can be formed by being extruded, cast, or molded. That patent discloses certain halogenated solvents for the copolymer such as ortho-dichlorobenzene, symmetrical trichlorobenzene, and perfluorokerosene; and discloses that solutions of the copolymer using those solvents occurs at above 130° C. and preferably above 170° C.

The sulfonyl fluoride fluoropolymers of high equivalent weight have proven difficult to dissolve at moderate conditions, such as at temperatures of about 20° to 30° C. below the copolymer melting point. U.S. Pat. No. 4,038,213 issued July 26, 1977 discloses that finely-divided particles of sulfonic acid-containing fluoropolymer can be dissolved in ethanol; but there is no disclosure of the solution of sulfonyl fluoride-containing fluoropolymers.

British Pat. No. 1,286,859 published Aug. 23, 1972 specifically discloses the difficulty of preparing solutions of such ionic copolymers and stands as a teaching of the tortuous means required for making a solution of such ionic fluoropolymers prior to the discovery of this invention. In that British patent, sulfonyl fluoride groups on fluorocarbons having equivalent weights less than 1000, are converted to sulfonic acid or sulfonamide. The sulfonic acid or amide form of fluoropolymers having relatively low equivalent weight is somewhat soluble in hydrocarbon alcohols of up to four carbon atoms.

German Preliminary Published Appl. No. 2,510,071 published Sept. 11, 1975 and U.S. Pat. No. 4,065,366 issued Dec. 27, 1977 disclose carboxyl-containing fluoropolymers having high equivalent weight which, in the methyl ester form, could be made into the solutions of this invention.

SUMMARY OF THE INVENTION

There is provided, in this invention, a solution of fluoropolymer in halogenated solvent wherein: the fluoropolymer is present in an amount greater than about 0.5 percent, by weight, of the solution at 25° C. The solvent is a perhalogenated hydrocarbon liquid having a solubility parameter within a particular range depending on the fluoropolymer to be dissolved. Preferred solvents have at least one alkyl segment, at least one alkyl ether segment, and at least one terminal polar group wherein the halogens in the liquid consist of F, Cl, Br, and I, the alkyls have one to three carbon atoms and the polar groups are either alkyl carboxyl ester or sulfonyl fluoride. The fluoropolymer of this invention is a copolymer of tetrafluoroethylene and perfluorinated sulfonyl fluoride- or carboxyl-containing vinyl monomer having an equivalent weight of greater than about 1000. For dissolving carboxyl-containing fluoropolymers, the solubility parameter range has been found to be 6.0 to 7.1 and preferably 6.2 to 6.8. For dissolving sulfonyl fluoride-containing fluoropolymers, the solubility parameter range has been found to be 5.5 to 6.7 and preferably 5.8 to 6.3; and density of the solvent is 1.6 to 2.1 g/cc and or higher preferably 1.7 to 2.0 g/cc. The upper density of 2.1 g/cc does not appear to be critical. Solvents of higher density are expected to work. For use in this invention, "fluoropolymers" are understood to be perfluorinated.

There is also provided a membrane made from the solution of fluoropolymer and used in liquid permeation processes and a support material coated with fluoropolymer from the solution and used in catalysis.

More specifically, the preferred solvent for the solution provided is

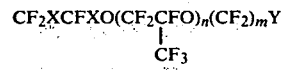

wherein X is F, Cl, Br, and I; n is 0, 1, and 2; m is 1, 2, and 3; and Y is COOCH₃ and SO₂F.

DETAILED DESCRIPTION OF THE INVENTION

Solvents used to dissolve fluorocarbons in the present invention can be generally characterized as perhalogenated hydrocarbon liquids having solubility parameters from 6.0 to 7.1 to dissolve carboxyl-containing fluoropolymers and solubility parameters from 5.5 to 6.7 and densities from 1.6 to 2.1 g/cc to dissolve sulfonyl fluoride-containing fluoropolymers. Preferred solvents have at least one alkyl segment, at least one alkyl ether segment, and at least one polar terminal group. More specifically, the alkyl includes one to three carbon atoms and the polar terminal groups are either alkyl carboxyl esters or sulfonyl fluoride.

The preferred solvent used in this invention is

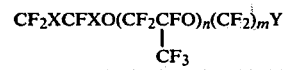

wherein X is F, Cl, Br, and I; n is 0, 1, and 2; m is 1, 2, and 3; and Y is COOCH₃ and SO₂F. Others are

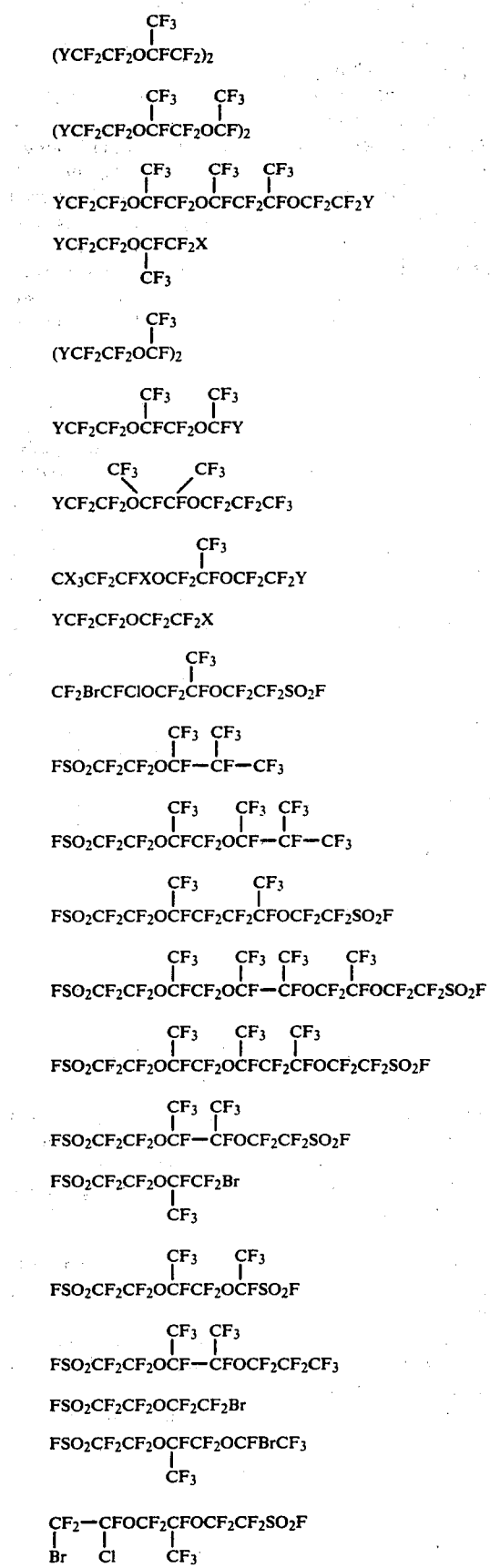

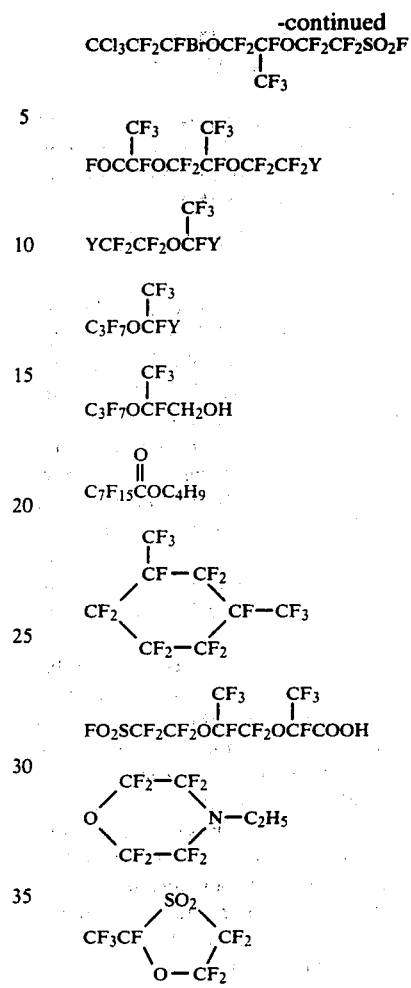

As was previously mentioned, solutions of the sulfonyl-containing fluoropolymers have been disclosed in the prior art to be made using perhalogenated aliphatic and aromatic hydrocarbons and perhalogenated alkyl ethers. Such solutions required relatively high temperatures for preparation and required relatively high temperatures to maintain the fluoropolymers in solution. In the solutions of this invention, fluoropolymers can be dissolved at temperatures of as low as 60 or more centigrade degrees below the melting point of the fluoropolymer; solutions can be made of as much as 6 percent or more by weight of the fluoropolymer at about 25° C.; and fluoropolymers having equivalent weights of up to 1500 or perhaps slightly more can be dissolved.

While it has been stated that the solvents used in this invention should be perhalogenated, it is possible that a liquid having a proper solubility parameter and density may be an adequate solvent with one or two hydrogen atoms in the place of halogen atoms on the carbon structure. For purposes of this invention, the solubility parameter is calculated to be $$\sqrt{\frac{\Delta H_\mu - RT}{V_m}} \text{ wherein}$$

$\Delta H_\mu$ is the molar heat of vaporization, R is the ideal gas law constant, T is absolute temperature, and $V_m$ is molar volume. For further explanation, see Journal of Applied Chemistry, Volume 3, page 71, 1953. For purposes of that calculation, molar heat of vaporization can be determined, in metric units, by the following empirical expression wherein $T_b$ is the solvent boiling point in degrees Kelvin:

$$\Delta H_\mu = 23.7 T_b + 0.02 T_b^2 - 2950.$$

for further explanation, see Polymer Handbook, J. Brandrup, E. H. Immergent, New York, 1975.

Solutions of the fluoropolymers are useful to cast films, either self-supported or on a substrate.

Catalysts can be made from these copolymers and the acids derived therefrom, especially catalysts in which thin coats of the copolymer have been deposited from the solutions of this invention on solid substrates, followed by conversion to the free acid form. The substrate may be porous or nonporous, metallic or nonmetallic, woven or nonwoven, inert or catalytically active.

Reverse osmosis membranes can be made from the solutions and used, for example, to make relatively salt-free water by pressuring sea water or brackish water against one side of a membrane. These membranes may be films, hollow fibers, or tubes or other shapes, may optionally be supported by a porous fabric, and will usually be used in the salt form.

Ultrafiltration membranes can be made in unsupported or supported form. These microporous membranes in the acid or salt form can be used to filter tiny particles such as colloids from a diluent.

Membranes for electrochemical cells can be made, and they can be fabric-supported or fibril-supported or fiber-supported or porous-sheet-supported or unsupported or coated directly on to an electrode. These would be suitable in the salt form for fuel cells and electrodialysis or electrolytic cells, especially for the electrolysis of solutions of salts such as NaCl. The availability of solutions makes available relatively thin membranes, which have the advantage of relatively low resistance.

Similarly, porous diaphragms for electrochemical cells can be coated with these copolymer solutions and converted to the acid or salt form for wettability and efficiency. The porous substrate can be the conventional asbestos, or can be a less toxic substrate made from short fibers or fibrils of an organic polymer which is chemically resistant to the chemicals in the cell. Among these are microporous, expanded, polytetrafluoroethylene sheets which can be prepared according to U.S. Pat. No. 3,953,566. Particularly attractive are the homopolymers and copolymers of fluorinated monomers such as tetrafluoroethylene and chlorotrifluoroethylene, which have good chemical resistance. The porous diaphragm can be made and then coated with the claimed solution, followed, of course, by conversion to the free acid or salt form. Alternatively, the support fibers or fibrils can be slurried in the claimed solution and then applied to the porous electrode or other base material by filtration, much as paper is made from a slurry of cellulose fibers.

Membranes made from these solutions can be used in hydrolyzed form for dialysis. Optionally, dialysis membranes may be supported. An example would be the use of Donnan dialysis to remove a heavy metal such as mercury or radioactive cesium or strontium from industrial wastes. Another example would be the concentration of dilute uranium salt solutions.

Ion exchange membranes can be made from these solutions. They may be supported or unsupported, flat or tubular, and may be used for such purposes as separating light cations from heavy cations. Of course, they would normally be converted to the salt form for such use.

Membranes made from these solutions may be used for mass transfer. The membranes may be unsupported or supported, flat or rolled or tubular, and in the acid or salt form. These membranes are very hydrophilic, and may be used to remove water from liquids or, especially, gases. These membranes may more generally be used to separate polar gases such as $H_2S$, $CO_2$ or $SO_2$ from nonpolar gases such as $H_2$, helium, or methane.

The solutions of this invention may be used in repairing pinholes in membranes made from the copolymers disclosed. A drop or two of solution is placed on the pinhole and the solvent is evaporated. If necessary, the process may be repeated.

Many nonwettable surfaces can be made wettable by treatment with the solutions of this invention, followed by evaporation of the solvent and conversion of the copolymer to the acid or especially the salt form. The nonwettable surfaces may be fluorocarbon polymers such as tetrafluoroethylene homopolymers or copolymers in fabric, fibril, sheet, film, powder, molded, or other forms. The wettable surface is advantageous for printing, dyeing, and adhesion.

An ion-selective electrode can be coated with a solution of this invention, followed by evaporation of the solvent and conversion to the acid or salt form. This would increase the ion selectivity of the electrode.

A gas detector for water or other polar gases could be made more sensitive by being coated by a solution of this invention, followed by removal of the solvent and conversion to the acid or salt form.

The solutions of the invention can be diluted with nonsolvents for the polymer to make dispersions and powders. Similarly, nonsolvents can be used to recover the solvents of this invention.

Solutions of two or more of the polymers disclosed can be mixed to make solutions of polymer blends. These can be used for any of the above applications.

The solutions of the invention can be used for cementing a surface of one of the disclosed polymers to another surface of the same polymer or another soluble polymer, as, for example, in patching of membranes.

The solvents disclosed can be used in small quantities as plasticizers for the copolymers disclosed. For example, plasticized polymer fluff might be molded into shapes, after which the solvent could optionally be removed.

The perfluoropolymer which is specifically preferred for use in this invention has tetrafluoroethylene as the ethylene component and at least one of the following as the vinyl monomer component:

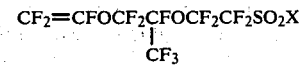

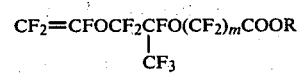

wherein X is F and Cl, n is 2–5, m is 1–3, and R is alkyl of 1–5 carbon atoms.

Monomer components of the fluoropolymers have been found to be inadequate as solvents for the fluoropolymers because the monomers are subject to rapid deterioration by oxidation into compounds which will not dissolve the fluoropolymer material. Liquids which spontaneously deteriorate or which react with the fluoropolymer are not eligible for use in this invention.

Moreover, the solvents disclosed to make solutions of this invention have been found to be inadequate to dissolve fluoropolymers having the polar groups in the acid form, such as sulfonic acid or carboxylic acid. The fluoropolymers of the solutions of this invention do not include polymers of free carboxylic acid or free sulfonic acid, or their alkali metal salts or sulfonamide polymers.

The fluoropolymer can have an equivalent weight of 600 to 1800; and, to obtain the maximum benefit of the solvents of this invention, have an equivalent weight greater than about 1000. The equivalent weight of a fluoropolymer is the molecular weight of a single repeat unit with one polar group.

The fluoropolymer can have a melting point of from about 180° to 300° C. and preferably has a melting point above about 200° C. Melting point of fluoropolymers is taken as the temperature of the endotherm minimum in a differential thermal analyzer heated at 20° C. per minute. The temperature required for solution of a fluoropolymer utilizing the solvents of this invention is generally more than 60° C. below the melting point of the fluoropolymer and substantially always more than 30° C. below the melting point.

Pressure of the system for making solutions of this invention can be above, below, or at atmospheric pressure. Because the solvents of this invention produce solutions at a temperature lower than the boiling point of the solvent, ambient atmospheric pressure is preferred and usually used.

The preferred means for preparing the sulfonyl fluoride solvents used in this invention includes reacting fluorosulfonyldifluoroacetyl fluoride with at least one mole of hexafluoropropylene oxide to obtain α-sulfonyl-ω-carbonyl fluoride. For this reaction, reference is made to U.S. Pat. No. 3,301,893. The carbonyl fluoride is then converted to a trifluorovinyl ether and the double bond is halogenated to obtain a solvent of this invention.

The preferred means for preparing the carboxyl solvent used in this invention includes reacting a lower alkyl β-alkoxytetrafluoropropionate with sulfur trioxide to obtain the corresponding carboalkoxydifluoroacetyl fluoride. The acetyl fluoride is then reacted with one or more moles of hexafluoropropylene oxide to yield α-carboxylic-ω-carbonyl fluoride. The carbonyl fluoride is then converted to a trifluorovinyl ether and the double bond is halogenated to obtain a solvent eligible for use in this invention. With regard to the starting β-alkoxytetrafluoropropionate, reference is made to U.S. Pat. No. 2,988,537. With regard to conditions and materials for conducting the above reactions to prepare other carboxyl solvents eligible for use in this invention, reference is made to U.S. Pat. No. 4,131,740 and 4,138,426.

Halogenation is generally accomplished by simple reactive contact with fluorine, chlorine, or bromine. For the purposes of this invention, mention of halogens is intended to refer only to fluorine, chlorine, bromine, and iodine because it is believed that astatine will not yield stable compounds; and, of course, in any solvent, the "X" of the structural formula includes the cases where different halogens are present in the same compound.

Solutions of fluoropolymers are made by stirring the fluoropolymer with the solvent at warm temperatures. As stated, solutions can usually be prepared by heating the system to a temperature 60° C. or more below the fluoropolymer melting point. Of course, it is recognized that, to some extent, solution rate is a function of temperature and that an increased temperature will result in increased rate of dissolution of a polymer in a solvent for that polymer. Once in solution, the fluoropolymers are not necessarily phased out or precipitated by a decrease in solution temperature.

Solutions, for the purpose of this invention, are molecular dispersions in the solvent such that the solution system is clear and does not appreciably scatter light transmitted through the solution and does not exhibit a polymer concentration gradient after centrifugation. Solutions have more than 0.5 percent, by weight, preferably more than 1.0 percent, by weight, and most preferably more than 3.0 percent, by weight, of the fluoropolymer.

DESCRIPTION OF PREFERRED EMBODIMENTS

PREPARATION OF SOLVENTS

EXAMPLE A

Preparation of

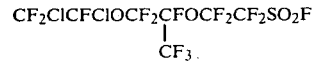

(perfluoro[2-(2-fluorosulfonylethoxy)-propyl-1,2-dichloroethyl ether].

A 2-liter 3-necked flask was fitted with a stirrer, gas inlet tube and dry ice cooled condenser. The apparatus was blanketed with nitrogen, 3276.1 g of perfluoro[2-(2-fluorosulfonylethoxy)-propyl vinyl ether] added and chlorine bubbled into the flask while irradiating with a sunlamp until no more chlorine was absorbed. Distillation yielded 2533.8 g (66.7%) of perfluoro[2-(2-fluorosulfonylethoxy)propyl-1,2-dichloroethyl ether], b.p. 165° C.

The structure was confirmed by infrared and nuclear magnetic resonance spectroscopy and elemental analysis.

The vinyl ether starting material was made by the method described in U.S. Pat. No. 3,301,893.

The starting material can, of course, be fluorinated or brominated by use of fluorine or bromine gas in the same process.

As an alternative method for preparing the title compound, but in perfluorinated form, a mixture of 12.1 g of antimony pentafluoride and 93 g of

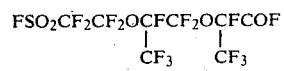

was stirred at 27°-32° C. until gas evolution stopped and then an additional 20 hours at about 25° C. The organic layer was separated, washed with aqueous sodium bicarbonate, dried with calcium chloride, and distilled to give 56.0 g (63.7%)

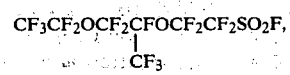

b.p. 113°, whose structure was confirmed by infrared and nuclear magnetic resonance spectroscopy and elemental analysis.

EXAMPLE B

Preparation of

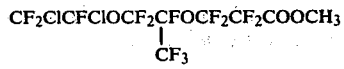

(methyl perfluoro-8,9-dichloro-5-methyl-4,7-dioxaoctanoate).

Sulfur trioxide (40 milliliters) was added to a 3-neck flask attached to a still and fitted with a dropping funnel and thermometer. Crude methyl-methoxytetrafluoromethylpropionate ($CH_3OCF_2CF_2COOCH_3$, 100 grams) was added dropwise from the funnel to the sulfur trioxide under agitation at a rate to maintain a gentle reflux due to the exothermic reaction. When addition was complete, the mixture was distilled at atmospheric pressure. Product distilling at 82°–86° C. was shown by gas chromatographic analysis to contain about 69.5 g of $H_3COOCCF_2COF$ (85%) and the remainder mostly $CH_3OSO_2F$. This mixture was passed over sodium fluoride pellets at about 400° C./4 mm, converting the $CH_3OSO_2F$ to $CH_3F$ and $NaOSO_2F$. Pure $H_3COOCCF_2COF$ was then isolated by distillation.

Cesium fluoride (15 grams) was completely dried using heat and a vacuum in a 500 milliliter flask. Tetraglyme (tetraethylene glycol dimethyl ether, 20 milliliters) and $H_3COOCCF_2COF$ (63 grams, 0.4 mole) were added under nitrogen and the temperature was reduced to −10° C. The flask was evacuated and hexafluoropropylene oxide was added to a pressure of 600 millimeters of mercury. Agitation was commenced and the pressure of the propylene oxide was maintained at 600 millimeters by means of a regulator. The propylene oxide was absorbed during an exothermic reaction and the temperature was maintained between 0° C. and −10° C. The reaction was stopped when 140 grams (0.84 moles) of the propylene oxide had been absorbed.

Distillation of the heavy layer from the flask resulted in about 15 grams of a material of the following formula:

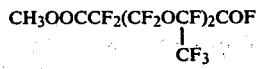

in the cut taken at 106° C. under a pressure of 100 millimeters of mercury.

A portion of the material (6.4 grams) was placed into the top of a vertical quartz tube about 2.5 centimeters in diameter and 30 centimeters long containing 90 cc of dried and finely divided sodium phosphate. The contents of the tube were heated to 235°–240° C. and nitrogen was passed through the tube and into and through a dry ice cooled trap where the reaction product was condensed. Distillation yielded 3.7 grams (67%) of methyl 3-[2-(trifluoroethenoxy)-1-(trifluoromethyl)trifluoroethoxy] tetrafluoropropionate.

To make the title compound, a mixture of 77.9 g of that tetrafluoropropionate and 100 ml 1,1,2-trichloro-1,2,2-trifluoroethane was irradiated with a sunlamp and chlorine added until no more chlorine was absorbed. The reaction mixture was cooled, 75 ml of anhydrous methanol was added slowly, and the resulting material added to 1.6 liters of cold water. The organic layer was distilled to give 91.0 g (90%)

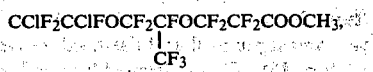

b.p. 77–78 at 10 mm, confirmed by infrared and nuclear magnetic resonance spectroscopy.

To make the brominated form of the title compound a mixture of 117.5 g of that tetrafluoropropionate and excess bromine was irradiated with a sunlamp until bromine uptake ceased. The excess bromine was destroyed by reaction with aqueous sodium bisulfite. The organic product was distilled to give 147.3 g (91%)

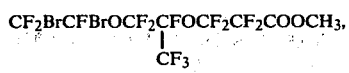

b.p. 86°–88° C. at 9 mm, confirmed by infrared and nuclear magnetic resonance spectroscopy.

EXAMPLE C

Preparation of $FSO_2CF_2CF_2OCF_2CF_2Br$

A mixture of 5.8 g potassium fluoride, 60 ml acetonitrile and 12 ml fluorosulfonyl difluoroacetyl fluoride was heated at 80° C. for one hour. The resulting mixture was placed in a stainless steel autoclave and heated at 50° C. for one hour and 80° C. for one hour with 16 g of bromine and 30 g of tetrafluoroethylene. The reaction mixture was poured into a solution of sodium bisulfite, 50 ml 1,1,2-trichloro-1,2,2-trifluoroethane was added and the mixture was distilled to give a distillate boiling up to 100° C. which contained two layers. The organic layer was separated and distilled to give $FSO_2CF_2CF_2OCF_2CF_2Br$, b.p. 106°, confirmed by infrared, nuclear magnetic resonance and mass spectroscopy.

EXAMPLE D

Preparation of

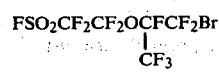

Heating 50 g of

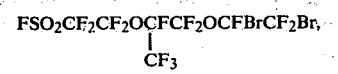

the brominated solvent of Example A, at 325° C. for 4 hours gave 40 g of a clear colorless liquid. Distillation yielded 17.1 g of

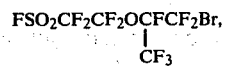

b.p. 124° C., confirmed by infrared and nuclear magnetic resonance spectroscopy.

EXAMPLE E

Preparation of

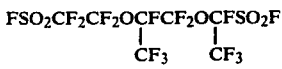

A mixture of 12 g of cesium fluoride, 45 ml diglyme (diethyleneglycol dimethyl ether), 66.9 g perfluoro[2-(2-fluorosulfonylethoxy)-propyl vinyl ether], and 32 g sulfuryl fluoride was heated at 65° C. for 8 hours. The lower layer was separated and distilled to yield the title compound, b.p. 159° C., confirmed by nuclear magnetic resonance and mass spectroscopy as well as elemental analysis.

PREPARATION OF SOLUTIONS

EXAMPLE 1

In this Example, solutions were prepared using solvents of the invention and a fluoropolymer of $CF_2=CF_2$ copolymerized with

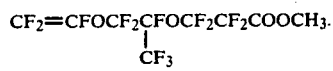

The fluoropolymer exhibited a melting point of 200° C., a melt viscosity of 3000 poises at 250° C., and an equivalent weight of 1050.

(i) Two grams of cubes of the fluoropolymer were stirred in 30 grams of the title solvent of Example A at 120° C. for 4 hours. The system was stirred at about 25° C. for an additional 12-15 hours and was then centrifuged. A sample of the supernatant liquid (6.11 grams) was evaporated at 110° C. in a vacuum oven, leaving 0.3246 g polymer. The solution was 5.3 weight percent polymer.

(ii) One-half gram of the fluoropolymer was stirred in 10 grams of the brominated solvent of Example B at 100° C. for 3 hours. The system was centrifuged at about 25° C. A sample of the supernatant liquid (8.597 grams) was evaporated at 150° C. at 200 mm mercury, leaving 0.316 g polymer. The solution was 3.7 weight percent polymer.

(iii) Two grams of the fluoropolymer were stirred in 14.1 g of the title solvent of Example B at 100° C. for 4 hours. The system was cooled to about 25° C. and centrifuged. A sample of the supernatant liquid (6.1566 g) was evaporated at 110° C. in a vacuum oven, leaving 0.1863 g polymer. The solution was 3.03 weight percent polymer.

(iv) At temperatures of less than about 125° C. the same fluoropolymer is unaffected by and does not dissolve in other perfluorinated solvents such as decafluorobenzophenone, octafluoronaphthalene, and perfluorokerosene.

EXAMPLE 2

In this Example, solutions were prepared using solvents of the invention and various fluoropolymers of $CF_2=CF_2$ copolymerized with

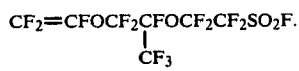

(i) An amount of the fluoropolymer, having an equivalent weight of 971, a melting point of 220° C., and a melt viscosity of 1800 poises at 250° C. was mixed with an amount of the title solvent of Example A to yield a system of 6.3 weight percent polymer. The system was stirred at about 150°-160° C. for 7 hours and was cooled to 25° C. and centrifuged. The entire polymer sample remained dissolved. The solution was 6.3 weight percent polymer.

(ii) One gram of the fluoropolymer, having an equivalent weight of 1050, was stirred with 10 g of the title solvent of Example E at about 159° C. for 2 hours and was cooled to 25° and centrifuged. A sample of the supernatant liquid (7.0 grams) was evaporated at 150° C. at 200 mm mercury, leaving 0.19 g polymer. The solution was 2.7 weight percent polymer.

In another test with this fluoropolymer, one gram of the fluoropolymer was stirred with 10 g of

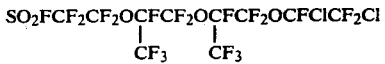

at about 180° C. for 3 hours and was cooled to 25° C. and centrifuged. A sample of the supernatant liquid (4.624 g) was evaporated at 150° C. at 200 mm mercury, having 0.149 g polymer. The solution was 3.2 weight percent polymer.

(iii) An amount of the fluoropolymer, having an equivalent weight of 1075, a melting point of 213° C., and a melt viscosity of 6900 poises at 250° C., was mixed with an amount of the title solvent of Example A to yield a system of 6.3 weight percent polymer. The system was stirred at about 150°-160° C. for 7 hours and was cooled to 25° C. and centrifuged. A sample of the supernatant liquid was evaporated at 110° C. in a vacuum oven. The polymer remaining indicated that the solution was 3.03 weight percent polymer.

(iv) The preceding portion of this Example, (iii), was repeated using a fluoropolymer having an equivalent weight of 1200, a melting point of 240° C., and a melt viscosity of 13,500 poises at 250° C., and using the same solvent. The solution was 2.7 weight percent polymer.

(v) Portion (iii) of this Example was repeated using a fluoropolymer having an equivalent weight of 1500, a melting point of 264° C., and a melt viscosity of 4500 poises at 290° C., and using the same solvent. The solution was 0.76 weight percent polymer.

This was repeated using the fluorinated form of the title solvent of Example A and a portion of the fluoropolymer was dissolved.

EXAMPLE 3

In this Example, a variety of solvents was used to dissolve both, sulfonyl fluoride-containing and carboxyl-containing fluoropolymers. The sulfonyl fluoride-containing fluoropolymers was that polymer used in Example 2 (iii), above, and the carboxyl-containing fluoropolymer was that polymer used in Example 1, above.

In each test, 0.4 to 0.8 g of the fluoropolymer was stirred with about 8 g of the solvent at about 120° C. or the solvent boiling point for about 4 hours. The system was then cooled and centrifuged and the fluoropolymer concentration in the solution was determined.

In the following table, there is provided the density and solubility parameters of each solvent is reported along with the concentrations of each fluoropolymers in each solvent when the information was available. The solvents are grouped, in accordance with previously discussed density and solubility parameter criteria, into solvents for sulfonyl fluoride-containing (S.F.)

fluoropolymers, carboxyl-containing (C.) fluoropolymers, and both.

film was hydrolyzed in 28 weight percent aqueous sodium hydroxide at 80° C.

| Solvent | Density g/cc-23° C. | Solubility Parameters | Fluoropolymer Concentration in Solution S.F. | (wt. %) C. |
|---|---|---|---|---|
| S.F. Fluoropolymer Solvents | | | | |
| $CF_3CF_2OCF_2CFOCF_2CF_2SO_2F$<br>       $\|$<br>      $CF_3$ | 1.68 | 5.7 | 1.0 | — |
| $CF_3CFOCF_2CFOCF_2CF_2SO_2F$<br>   $\|$          $\|$<br>  $SO_2F$    $CF_3$ | 1.75 | 5.9 | 2.7 | — |
| $FO_2S(CF_2)_2OCFCF_2OCFCF_2OCFCl$<br>                $\|$           $\|$         $\|$<br>              $CF_3$    $CF_3$    $CF_2Cl$ | 1.792 | 5.8 | 3.2 | 0.04 |
| Perfluorotributylamine | 1.88 | 5.6 | 1.9 | 0 |
| Perfluoro-2-butyl-tetrahydrofuran | 1.77 | 5.9 | 1.6 | 0 |
| Perfluoro-N—ethyl morpholine | 1.744 | 5.9 | 2.1 | — |
| C. Fluoropolymer Solvents | | | | |
| $FOCCFOCF_2CFOCF_2CF_2COOCH_3$<br>        $\|$            $\|$<br>      $CF_3$       $CF_3$ | 1.643 | 6.0 | 0 | 3.0 |
| $CH_3OOC(CF_2)_2OCFCOOCH_3$<br>                  $\|$<br>                $CF_3$ | 1.59 | 6.3 | 0.1 | 1.1 |
| $C_3F_7OCFCOOCH_3$<br>      $\|$<br>    $CF_3$ | 1.566 | 6.1 | 0.4 | 0.8 |
| $CF_2BrCFBrOCF_2CFOCF_2CF_2COOCH_3$<br>                   $\|$<br>                 $CF_3$ | 2.321 | 6.8 | 0.03 | 3.7 |
| $C_3F_7OCFCH_2OH$<br>      $\|$<br>    $CF_3$ | 1.668 | 6.8 | 0 | 1.2 |
| n-butyl perfluorooctanoate | 1.53 | 6.2 | 0 | 4 |
| Solvents for S.F. and C. | | | | |
| $CF_2ClCFClOCF_2CFOCF_2CF_2SO_2F$<br>                 $\|$<br>               $CF_3$ | 1.771 | 6.2 | 3.0 | 5.3 |
| $CF_2BrCFBrOCF_2CFOCF_2CF_2SO_2F$<br>                 $\|$<br>               $CF_3$ | 2.010 | 6.3 | 4.0 | 1.6 |
| $CF_3CF\underset{\diagdown OCF_2 \diagup}{\overset{\diagup SO_2 \diagdown}{}}CF_2$ | 1.720 | 6.5 | 1.6 | — |
| $FO_2S(CF_2)_2OCFCF_2Br$<br>              $\|$<br>            $CF_3$ | 1.908 | 6.3 | 1.8 | 1.1 |
| Perfluoro-1,3-dimethylcyclohexane | 1.843 | 6.1 | 8.9 | 6 |
| $FO_2S(CF_2)_2OCFCF_2OCFCOOH$<br>              $\|$          $\|$<br>            $CF_3$    $CF_3$ | 1.779 | 6.6 | 1.6 | 4.5 |

PREPARATION OF ARTICLES

EXAMPLE I

In this Example, films were made from fluoropolymer solutions for use in reverse osmosis cells.

(i) Two grams of the fluoropolymer of Example 2(i) were dissolved in 45 g of the title solvent of Example A and 5 ml of that solution were cast to make a circular film 10 centimeters in diameter. Solvent was evaporated from the film at 80° C. at 300 mm mercury and the dried In a hyperfiltration cell, utilizing a 0.3 weight percent sodium chloride test solution the $H_2O$ flux density at $5.7 \times 10^3$ KPa was $1.872 \times 10^{-6}$ m/s and the salt rejection at $5.7 \times 10^3$ KPa was 82.6%.

(ii) A film was cast from a 3 weight percent solution of the fluoropolymer of Example 6 and the title solvent of Example A. The film was dried under the same condition as in (i), above, and had a thickness of about 50 microns. The film was hydrolyzed in 1 normal sodium hydroxide.

The water flux density at $5.7\times10^3$ KPa was $7.5\times10^{-8}$ m/s and the salt rejection at $5.7\times10^3$ KPa was 98.8%.

Asymmetric or anisotropic membranes for liquid permeation processes can also be made from the fluoropolymer solutions. The diluent or nonsolvent used in making the anisotropic membrane should be selected from among those nonsolvents which do not react with the solvent used, so that the solvent can be recovered and used again. Anisotropic membranes and a method for making them are described in U.S. Pat. No. 3,615,024.

EXAMPLE II

A film was prepared in Example I(i) was mounted in a dialysis cell containing 1 g NiSO$_4$·8H$_2$O in 100 g water on one side and 2 normal H$_2$SO$_4$ on the other side of the film. After 5 hours of operation the nickel concentration was reduced by 92 weight percent on the NiSO$_4$ side.

EXAMPLE III

A film as was prepared in Example I(ii) was mounted in chlor-alkali laboratory cell and was tested at 60° C., 1 ASI current density in 6.5 weight percent caustic concentration. The cell ran for more than four days at 3.4 volts; 96% current efficiency; 2350 kilowatt hours per metric ton of caustic, power consumption; and 2.11 moles of water transported across the membrane per mole of sodium transported across the membrane.

EXAMPLE IV

A cylindrical catalyst support of inert alumina about 2.5 cm long and 2.5 cm in diameter, and having a 1 mm pore size, was immersed in a 3 weight percent solution of a fluoropolymer similar to that of Example 2(iii) but having an equivalent weight of 1100 in the title solvent of Example A. The solvent was evaporated from the immersed support at 130° C. at 200 mm mercury. The support was coated with about 600 milligrams of the fluoropolymer.

The fluoropolymer was hydrolyzed in one hour at 100° C. in a mixture of 1 part dimethylsulfoxide and 2 parts 12 weight percent aqueous potassium hydroxide. The hydrolyzed fluorocarbon was placed in the acid form with 10 weight percent hydrochloric acid and then dried.

The resulting supported catalyst was placed in a flask with 100 ml diethyl phthalate and was heated to 250° C. Due to the catalyst, phthalic anhydride was formed and ethanol was released and removed by distillation.

EXAMPLE V

A membrane of perfluoropolymer in the sodium carboxylate form and having a 2-centimeter tear is patched by first acidifying the fluoropolymer with 10 percent aqueous hydrochloric acid, and then forming the methyl ester by contacting the acidified fluoropolymer with hot methanol. The membrane is then dried and the title solvent of Example B is applied to both, the torn membrane and a patch of membrane in the methyl ester carboxyl form having a 3-centimeter diameter. The patch is pressed over the tear, at a temperature of 100° C. and a pressure of less than about 1400 KPa, and the patched membrane is heated to evaporate the solvent. The membrane, thus repaired, is leak-free by vacuum test and can be used as though it were never torn.

We claim:

1. A membrane for use in liquid permeation processes made from a solution of fluoropolymer in halogenated solvent wherein: the fluoropolymer is present in an amount greater than 0.5 percent, by weight, of the solution at 25° C.; the solvent is a perhalogenated, saturated liquid having at least one alkyl segment, at least one alkyl ether segment, and at least one terminal polar group wherein the halogens in the liquid are selected from the group consisting of F, Cl, Br, and I, the alkyls have one to three carbon atoms, and the polar groups are either alkyl carboxyl ester or sulfonyl fluoride; and the fluoropolymer is a copolymer of tetrafluoroethylene and perfluorinated sulfonyl fluoride- or carboxyl-containing vinyl monomer having an equivalent weight of greater than 1000.

2. The membrane of claim 1 wherein the sulfonyl fluoride- or carboxyl-containing vinyl component of the fluoropolymer has been hydrolyzed.

3. An inert support material coated by fluoropolymer from a solution of fluoropolymer in halogenated solvent wherein: the fluoropolymer is present in an amount greater than 0.5 percent, by weight, of the solution at 25° C.; the solvent is a perhalogenated, saturated liquid having at least one alkyl segment, at least one alkyl ether segment, and at least one terminal polar group wherein the halogens in the liquid are selected from the group consisting of F, Cl, Br, and I, the alkyls have one to three carbon atoms, and the polar groups are either alkyl carboxyl ester or sulfonyl fluoride; and the fluoropolymer is a copolymer of tetrafluoroethylene and perfluorinated sulfonyl fluoride- or carboxyl-containing vinyl monomer having an equivalent weight of greater than 1000.

4. The support material of claim 23 wherein the sulfonyl fluoride- or carboxyl-containing vinyl component of the fluoropolymers has been hydrolyzed to the free acid form.

* * * * *

UNITED STATES PATENT OFFICE
CERTIFICATE OF CORRECTION

PATENT NO. : 4,414,280
DATED : November 8, 1983
INVENTOR(S) : Silva et al.

It is certified that error appears in the above-identified patent and that said Letters Patent are hereby corrected as shown below:

Claim 4, line 1: "23" should be --3--.

Signed and Sealed this

Seventh Day of February 1984

[SEAL]

Attest:

GERALD J. MOSSINGHOFF

Attesting Officer

Commissioner of Patents and Trademarks